(12) United States Patent
Georges et al.

(10) Patent No.: US 8,466,224 B2
(45) Date of Patent: Jun. 18, 2013

(54) COMPOSITION WITH A BASE OF HYDRAULIC AND/OR POZZOLANIC MATERIAL

(75) Inventors: Sébastien Georges, Mions (FR); Cédric Comparet, Optevoz (FR); Bruno Thibaut, Sermerieu (FR); Emmanuel Villard, Saint Christo en Jarez (FR)

(73) Assignee: Lafarge, Paris (FR)

( * ) Notice: Subject to any disclaimer, the term of this patent is extended or adjusted under 35 U.S.C. 154(b) by 203 days.

(21) Appl. No.: 13/122,775

(22) PCT Filed: Oct. 8, 2009

(86) PCT No.: PCT/FR2009/001191
§ 371 (c)(1),
(2), (4) Date: Apr. 6, 2011

(87) PCT Pub. No.: WO2010/040915
PCT Pub. Date: Apr. 15, 2010

(65) Prior Publication Data
US 2011/0196069 A1    Aug. 11, 2011

(30) Foreign Application Priority Data
Oct. 10, 2008 (FR) ...................... 08 05597

(51) Int. Cl.
*C08K 3/34* (2006.01)
*C08K 3/00* (2006.01)

(52) U.S. Cl.
USPC ............................................. 524/445; 524/2

(58) Field of Classification Search
USPC ........................................................ 524/445
See application file for complete search history.

(56) References Cited

U.S. PATENT DOCUMENTS

| | | |
|---|---|---|
| 3,725,312 A | 4/1973 | Panzer |
| 3,738,945 A | 6/1973 | Panzer |
| 5,292,441 A | 3/1994 | Chen |
| 5,393,343 A | 2/1995 | Darwin |
| 5,614,017 A | 3/1997 | Shawl |
| 2008/0060556 A1* | 3/2008 | Jacquet et al. ............... 106/802 |
| 2008/0300344 A1* | 12/2008 | Georges et al. ................... 524/5 |

FOREIGN PATENT DOCUMENTS

| | | |
|---|---|---|
| DE | 102005005691 | 8/2006 |
| EP | 0 056 627 | 7/1982 |
| EP | 2 065 349 | 6/2009 |
| EP | 2072531 | 6/2009 |
| FR | 1042084 | 10/1953 |
| FR | 2897057 | 8/2007 |
| JP | 58-74552 | 5/1983 |
| JP | 03-100295 | 4/1991 |
| JP | 9-20536 | 1/1997 |
| WO | WO 98/51640 | 11/1998 |
| WO | WO 2006/032786 | 3/2006 |

OTHER PUBLICATIONS

International Search Report for PCT/FR2009/001191.

* cited by examiner

*Primary Examiner* — Hui Chin
(74) *Attorney, Agent, or Firm* — Pillsbury Winthrop Shaw Pittman, LLP

(57) ABSTRACT

A mix including at least one hydraulic and/or pozzolanic material and at least one water-soluble cationic polymer, the cationic polymer having a density of cationic charges greater than 0.5 meq/g and an intrinsic viscosity less than 1 dl/g, and the hydraulic and/or pozzolanic material not being clinker, nor limestone, nor gypsum, nor calcium sulphate, nor anhydrous calcium sulphate, nor hemi hydrated calcium sulphate, nor plaster, nor lime.

15 Claims, No Drawings

COMPOSITION WITH A BASE OF HYDRAULIC AND/OR POZZOLANIC MATERIAL

CROSS-REFERENCE TO RELATED APPLICATIONS

This is the U.S. National Stage of PCT/FR2009/001191, filed Oct. 8, 2009, which in turn claims priority to French Patent Application No. 08/05597, filed Oct. 10, 2008, the entire contents of all applications are incorporated herein by reference in their entireties.

The present invention relates to a composition with a base of hydraulic and/or pozzolanic material making it possible to upgrade raw materials not used or little used until now for the production of a hydraulic composition, the said materials not being clinker, nor limestone, nor gypsum, nor calcium sulphate, nor anhydrous calcium sulphate, nor hemi hydrated calcium sulphate, nor plaster, nor lime.

The use of hydraulic and/or pozzolanic materials, which are not clinker, nor limestone, nor gypsum, nor calcium sulphate, nor anhydrous calcium sulphate, nor hemi hydrated calcium sulphate, nor plaster, nor lime, in cement formulations to form hydraulic compositions is well known to the person skilled in the art (refer in particular to cements with additions of the CEM II to CEM V types according to the EN 197-1 Standard, which specifies the nature and the quantity of the said hydraulic and/or pozzolanic materials).

However, the hydraulic and/or pozzolanic materials, which are not clinker, nor limestone, nor gypsum, nor calcium sulphate, nor anhydrous calcium sulphate, nor hemi hydrated calcium sulphate, nor plaster, nor lime, have characteristics which make their use sometimes difficult because they do not intrinsically correspond to the requirements of the formulators. A more or less important part of the said hydraulic and/or pozzolanic materials can not therefore be used for the production of hydraulic compositions. The use of such hydraulic and/or pozzolanic materials may for example induce problems in terms of water demand or over dosages of admixtures.

In order to respond to the needs and requirements of the formulators, it has become necessary to find a means of upgrading hydraulic and/or pozzolanic materials, which are not clinker, nor limestone, nor gypsum, nor calcium sulphate, nor anhydrous calcium sulphate, nor hemi hydrated calcium sulphate, nor plaster, nor lime, and which are little suitable or not suitable for the production of hydraulic compositions.

Therefore, the problem which the invention intends to solve is to provide a new means adapted to upgrade hydraulic and/or pozzolanic materials, which are not clinker, nor limestone, nor gypsum, nor calcium sulphate, nor anhydrous calcium sulphate, nor hemi hydrated calcium sulphate, nor plaster, nor lime, and which cannot be used or have been little used until now for the production of hydraulic compositions, whilst still obtaining the performances of standard hydraulic compositions.

Unexpectedly, the inventors have shown that it is possible to use particular cationic polymers to upgrade hydraulic and/or pozzolanic materials, the said materials not being clinker, nor limestone, nor gypsum, nor calcium sulphate, nor anhydrous calcium sulphate, nor hemi hydrated calcium sulphate, nor plaster, nor lime.

With this aim the present invention proposes a mix comprising at least one hydraulic and/or pozzolanic material and at least one water-soluble cationic polymer, the said cationic polymer having a density of cationic charges greater than 0.5 meq/g and an intrinsic viscosity less than 1 dl/g, and the said hydraulic and/or pozzolanic material not being clinker, nor limestone, nor gypsum, nor calcium sulphate, nor anhydrous calcium sulphate, nor hemi hydrated calcium sulphate, nor plaster, nor lime.

The invention offers determining advantages, in particular the hydraulic compositions obtained from the mix according to the present invention require a much lower dosage of superplasticizer than what would be necessary for a hydraulic composition obtained from the same hydraulic and/or pozzolanic materials in the same proportions but without a cationic polymer, for an identical consistency or fluidity.

According to another advantage of the invention, the hydraulic compositions obtained from the mix according to the present invention require a much lower quantity of total water than what would be required for a hydraulic composition obtained from the same hydraulic and/or pozzolanic materials in the same proportions but without a cationic polymer, for an identical consistency or fluidity.

Another advantage offered by the invention is that the hydraulic compositions comprising the mix according to the present invention have a lower water demand than those of the same hydraulic and/or pozzolanic materials but without a cationic polymer.

According to another advantage of the invention, the hydraulic compositions comprising the mix according to the present invention have a better slump retention.

Another advantage of the invention is the reduction of emissions of $CO_2$. The mix according to the present invention does indeed make it possible to use, as a substitution of the clinker a greater quantity of hydraulic and/or pozzolanic materials, the said materials not being clinker, nor limestone, nor gypsum, nor calcium sulphate, nor anhydrous calcium sulphate, nor hemi hydrated calcium sulphate, nor plaster, nor lime, and without degrading the performances of the obtained hydraulic compositions, in particular in terms of rheology and mechanical strengths.

Furthermore, the invention has the advantage of being easy to use because the determination of the quantity of cationic polymer according to the present invention may be easily determined by simply measuring the methylene blue value (refer to the NF EN 933-9 Standard appendix A and the NF 18-595 Standard). The methylene blue value does indeed make it possible to determine the cleanliness of granular materials, for example hydraulic and/or pozzolanic materials such as defined according to the present invention, which is to say the quantity of impurities (for example clays) contained in these materials. Routine tests make it possible to trace the curve (dosage of cationic polymer according to the present invention as function of the measured methylene blue value) and hence determine, for a given granular material, the relation existing between the methylene blue value and the quantity of cationic polymer according to the present invention required to obtain the desired result.

Finally, the invention has the advantage of being able to be used in all industries, in particular the building industry, the chemical industry (admixture manufacturers) and in all the construction markets (building, civil engineering or pre-cast plant), the construction industry or the cement industry.

Other advantages and characteristics of the invention will clearly appear after reading the following description and the examples provided for non-limiting illustration and non-restrictive purposes.

The invention relates to a mix comprising at least one hydraulic and/or pozzolanic material and at least one water-soluble cationic polymer, the said cationic polymer having a density of cationic charges greater than 0.5 meq/g and an intrinsic viscosity less than 1 dl/g, and the said material not being clinker, nor limestone, nor gypsum, nor calcium sulphate, nor anhydrous calcium sulphate, nor hemi hydrated calcium sulphate, nor plaster, nor lime.

The expression <<hydraulic binder>> according to the present invention is to be understood as a material, which, mixed with water, forms a paste which sets and hardens as a result of hydration reactions and which, after hardening, keeps its strength and its stability even under water. Preferably, a hydraulic binder according to the present invention is a clinker or a cement, advantageously a Portland cement.

The expression <<hydraulic material>> according to the present invention is to be understood as a hydraulic binder which is not a clinker, nor limestone, nor gypsum, nor calcium sulphate, nor anhydrous calcium sulphate, nor hemi hydrated calcium sulphate, nor plaster.

The expression <<pozzolanic material>> according to the present invention is to be understood as a material which hardens upon contact with lime in an aqueous medium (refer to the EN 197.1 Standard paragraph 5.2.3.1). Even though a pozzolanic material requires lime to harden, lime per se is not considered to be a pozzolanic material.

The hydraulic and/or pozzolanic materials according to the present invention can not be any clinker whatsoever.

The hydraulic and/or pozzolanic materials according to the present invention can not be limestone, nor gypsum, nor calcium sulphate, nor anhydrous calcium sulphate, nor hemi hydrated calcium sulphate, nor plaster, nor lime. The hydraulic and/or pozzolanic materials according to the present invention may in particular be natural pozzolans, calcined pozzolans, calcined clays, calcined shale, fly ash, slags, silica fume or mixtures thereof. Preferably the hydraulic and/or pozzolanic materials according to the present invention are pozzolans, calcined clays, fly ash, silica fume or mixtures thereof.

The term <<pozzolans>> according to the present invention is to be understood as siliceous and/or siliceous-aluminate materials mainly comprising reactive $SiO_2$ and $Al_2O_3$. Among the pozzolans, mention may be made of natural pozzolans, which are generally materials of volcanic origin or sedimentary rocks, and calcined pozzolans, which are thermally-activated materials of volcanic origin, thermally-activated clays, thermally-activated shale or thermally-activated sedimentary rocks. (refer to the EN 197-1 Standard paragraph 5.2.3) The pozzolans according to the present invention may be selected from pumice, tuff, scoria or mixtures thereof.

The term <<calcined clays>> according to the present invention is to be understood as clays having been submitted to a thermal treatment.

The term <<clays>> according to the present invention is to be understood as phyllosilicates, mainly with a structure in layers, even a fibrous structure (for example aluminium and/or magnesium silicates), which, characterised by X-ray diffraction for example, have a [001] crystallographic lattice spacing ($d_{(001)}$) varying from 7 to 15 Angstroms. The clays according to the present invention may be selected from kaolinite ($d_{(001)}$=7 Angstroms), smectites (generic term used to designate swelling clays, one of which is montmorillonite), illite, muscovite ($d_{(001)}$=10 Angstroms), chlorites ($d_{(002)}$=14 Angstroms), or mixtures thereof.

The term <<calcined shale>> according to the present invention is to be understood as a material produced in a special furnace at a temperature of approximately 800° C. mainly comprising dicalcium silicate and monocalcium aluminate. (refer to the EN 197-1 Standard paragraph 5.2.5)

The term <<slag>> according to the present invention is to be understood as a slag selected from granulated blast-furnace slags according to the EN 197-1 Standard paragraph 5.2.2, steel slags or mixtures thereof.

The term <<fly ash>> according to the present invention is to be understood as a material obtained by electrostatic or mechanical precipitation of pulverulent particles contained in the fumes of boilers fed by pulverized coal (refer to the EN 197-1 Standard paragraph 5.2.4). The fly ash according to the present invention may be of a siliceous or calcic nature.

The term <<silica fume>> according to the present invention is to be understood as a material obtained by the reduction of high quality quartz by the coal in electric arc furnaces used for the production of silicon and alloys of ferrosilicon (refer to the EN 197-1 Standard paragraph 5.2.7). Silica fume is formed of spherical particles comprising at least 85% by mass of amorphous silica.

The term <<polymer>> according to the present invention is to be understood as a compound comprising more than two identical or different monomers in a particular order or not.

The term <<clinker>>, according to the present invention is to be understood as the product obtained after burning (clinkerisation) a mix (raw meal) comprising, among others, limestone and for example clay.

The term <<Portland clinker>> according to the present invention is to be understood as a hydraulic material constituted of at least two thirds by mass of calcium silicates ($3CaO.SiO_2$ and $2CaO.SiO_2$), the remaining part being constituted of phases containing aluminium and iron, as well as other components. The mass ratio $(CaO)/(SiO_2)$ should not be less than 2.0. The level of magnesium oxide (MgO) should not exceed 5.0% by mass.

The term <<hydraulic composition>> according to the present invention is to be understood as a composition capable of hydraulic setting, and most particularly slurries, mortars and concretes intended for all the construction markets (building, civil engineering, drilling wells or pre-cast plant).

The term <<hardened object>> according to the present invention is to be understood as an object obtained after the setting and hardening of a hydraulic composition. The object may for example be a wall, a floor, a foundation, a bridge pillar, a product from a pre-cast plant, a surface compound, a coating, a masonry binder, a jointing product or a glue.

The term <<water demand>> according to the present invention is to be understood as the quantity of water necessary to obtain target fluidity in a hydraulic composition.

The term <<active matter>> according to the present invention is to be understood as a compound which has an effect on the hydraulic and/or pozzolanic materials as defined according to the present invention within the scope of their use for the production of a hydraulic composition. In particular, active matter is not a solvent.

The Mix

Preferably, the mix according to the present invention comprises the said at least one hydraulic and/or pozzolanic material selected from natural pozzolans, calcined pozzolans, calcined clays, fly ash, calcined shale, slags, silica fume or mixtures thereof. Advantageously, the mix according to the present invention comprises the said at least one hydraulic and/or pozzolanic material selected from pozzolans, calcined clays, fly ash, silica fume or mixtures thereof.

Preferably, the mix according to the present invention comprises the said at least one hydraulic and/or pozzolanic material which is a pozzolan. Advantageously, the pozzolans of the mix according to the present invention are selected from pumice, tuff, scoria or mixtures thereof.

Preferably, the mix according to the present invention comprises the said at least one hydraulic and/or pozzolanic material which is a calcined clay. Advantageously, the calcined clays according to the present invention are selected from thermally-activated kaolinite, smectites, illite, muscovite, chlorites, or mixtures thereof.

Preferably, the mix according to the present invention comprises the said at least one hydraulic and/or pozzolanic material which is a fly ash.

Preferably, the mix according to the present invention comprises the said at least one hydraulic and/or pozzolanic material which is silica fume.

Preferably, the hydraulic and/or pozzolanic material according to the present invention may be calcined kaolinite, also called a metakaolin.

Preferably, the mix according to the present invention further comprises at least one typical admixture, for example a grinding agent, an accelerator, an air-entraining agent, a thickening agent, a retarder, a fluidizer, an anti-shrinkage agent or mixtures thereof.

Preferably, the mix according to the present invention comprises a quantity of cationic polymer less than or equal to 2%, preferably less than or equal to 1% relative to the hydraulic and/or pozzolanic material according to the present invention.

Preferably, the mix according to the present invention further comprises an accelerator. The said accelerator may be any known accelerator, advantageously a calcium salt.

Cationic Polymer

According to the present invention the cationic polymer is water-soluble and has a cationicity greater than 0.5 meq/g, preferably greater than 1 meq/g, and in particular greater than 2 meq/g.

According to the present invention the cationic polymer further has a molecular weight which is expressed by an intrinsic viscosity less than 1 dl/g, preferably less than 0.8 dl/g, and in particular less than 0.6 dl/g.

The cationic polymer according to the present invention may have a linear, comb or branched structure. Preferably, the cationic polymer according to the present invention is linear. Excluded from the cationic polymers according to the present invention are the insoluble cationic polymers in aqueous mediums, for example the SBR cationic latexes as described in patent application JP H09-020536.

The cationic groups may in particular be phosphonium, pyridinium, sulfonium and quaternary amine groups, the last ones being preferred. These cationic groups may be located in the chain of the polymer or as a pendant group.

A large number of cationic polymers are known per se. Such polymers can be obtained directly using one of the known processes of polymerisation, such as radical polymerisation, polycondensation or polyaddition.

They may also be prepared by means of post-synthetic modification of a polymer, for example by means of grafting groups carrying one or more cationic functions to a polymer chain carrying appropriate reactive groups.

The polymerisation is carried out starting with at least one monomer carrying a cationic group or an adapted precursor.

The polymers obtained from monomers carrying amine and imine groups are particularly advantageous. Nitrogen can be quaternised after polymerisation in known manner, for example by means of alkylation using an alkylating compound, for example with methyl chloride, or in an acid medium, by means of protonation.

The cationic polymers containing cationic groups of quaternary amine are particularly appropriate.

Monomers which already carry a cationic quaternary amine function may include in particular the salts of diallyldialkyl ammonium, quaternised (meth)acrylates of dialkylaminoalkyl, and (meth)acrylamides N-substituted by a quaternised dialkylaminoalkyl.

The polymerisation can be carried out with non ionic monomers, preferably having a short chain, comprising from 2 to 6 atoms of carbon. Anionic monomers may also be present as long as they do not affect the cationic groups.

In the context of the modification of polymers by means of grafting, mention may be made of grafted natural polymers such as cationic starches.

Advantageously, the cationic polymer according to the present invention contains groups whose cationic character is present only in an acid medium. Tertiary amine groups, which are cationic by means of protonation in an acid medium, are particularly preferred. The absence of ionic nature in hydraulic compositions of the concrete or mortar type having an alkaline pH further improves their robustness with regard to other ionic compounds, in particular anionic compounds.

By way of example, mention may be made of cationic polymers from the polyvinylamines family, which can be obtained by means of polymerisation of N-vinylformamide, followed by hydrolysis. The quaternised polyvinylamines may be prepared as described in U.S. Pat. No. 5,292,441. Polymers of the polyethyleneimine type are also suitable. The latter are quaternised by means of protonation.

Particularly preferred are the cationic polymers obtained by means of polycondensation of epichlorhydrin with a mono- or dialkylamine, in particular methylamine or dimethylamine. Their preparation is described for example in U.S. Pat. Nos. 3,738,945 and 3,725,312.

Preferably, the cationic polymers may be polymers of natural origin. Mention may in particular be made of protonated or quaternised chitosa.

The unit of the cationic polymer obtained by means of polycondensation of dimethylamine and epichlorohydrin can be represented as follows:

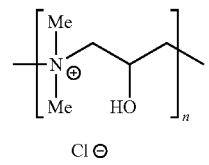

Also appropriate are polymers of the polyacrylamide type modified by means of a Mannich reaction, such as polyacrylamide N-substituted by a dimethylaminomethyl group.

Also appropriate are the cationic polymers obtained by means of polycondensation of dicyandiamide and formaldehyde. These polymers and the process for obtaining them are described in French patent No. 1 042 084.

Preferably, the cationic polymers according to the present invention may be quaternised by means of a salt of ammonium other than ammonium hydrochloride.

Advantageously, the cationic polymer according to the present invention may have other properties in addition to those described in the present patent application. In particular, the cationic polymer according to the present invention may be a grinding facilitator of clinker or of hydraulic and/or pozzolanic materials according to the present invention, also known as grinding agent.

Superplasticizer

Preferably, the mix according to the present invention comprises, besides a specific cationic polymer, also at least one superplasticizer.

The term <<superplasticizer>> according to the present invention is to be understood as an organic molecule typically used in the domain of hydraulic compositions in order to fluidize hydraulic compositions or reduce the dosage of water for a same consistency. A superplasticizer according to the present invention may be for example an anionic polymer with a comb structure, such as a polycarboxylate polyoxide (PCP), a lignosulfonate, a polyoxyalkylen diphosphonate or mixtures thereof.

The term <<polycarboxylate polyoxide>> or <<PCP>> according to the present invention is to be understood as a copolymer of acrylic or methacrylic acids, and of their esters of poly (oxide ethylene) (POE).

Preferably, the superplasticizer according to the present invention is selected from the most efficient superplasticizers to reduce the viscosity of hydraulic compositions.

Preferably, the superplasticizer according to the present invention is selected from the most efficient superplasticizers to reduce the viscosity of hydraulic compositions.

Preferably, the superplasticizer according to the present invention has a molecular weight less than 200000 g/mol, preferably less than 100000 g/mol and preferably less than 80000 g/mol.

The superplasticizer according to the present invention may have a linear, branched or comb structure.

Preferably, at least one of the cationic polymer and the superplasticizer has a comb structure.

Most particularly preferred is a superplasticizer with a comb structure. In this case, the main chain is generally hydro carbonated.

The superplasticizer according to the present invention may in particular comprise carboxylic, sulfonic, saccharide or aminated groups.

The superplasticizer according to the present invention may further contain non ionic pendant groups, in particular, polyether groups. Polyether groups generally comprise units of ethylene oxide or propylene oxide or a combination of the two.

The superplasticizer according to the present invention may also further contain pendant groups of the di- or oligo-saccharide types (see for example European patent application 2072531) or of the polyamide polyamine type (see for example European patent application 2065349).

A great number of superplasticizers such as described are known per se.

They may be directly obtained by means of copolymerisation, a means described in patents EP 0056627, JP 58074552, U.S. Pat. No. 5,393,343.

They may also be prepared by post-synthetic modification of a polymer, as described for example in U.S. Pat. No. 5,614,017.

The superplasticizer according to the present invention may be added at different moments in the production process, at the same time or separately from the cationic polymer according to the present invention. It may be first mixed with the hydraulic and/or pozzolanic material according to the present invention. According to a variant, it may be added at the time of preparation of the hydraulic composition according to the present invention.

Hydraulic Composition

A further aspect of the present invention is a hydraulic composition comprising at least one mix according to the present invention and at least one hydraulic binder. Preferably, the said hydraulic binder is a Portland cement.

The composition according to the present invention may be obtained by separate grinding of the different constituents or by co-grinding of the different constituents.

Preferably, the mix, the cationic polymer and the superplasticizer of the hydraulic composition according to the present invention have the same characteristics as those described hereinabove.

Preferably, the hydraulic composition according to the present invention further comprises aggregates.

Preferably, the hydraulic composition according to the present invention further comprises an accelerator. The said accelerator may be any known accelerator, advantageously a calcium salt.

Treatment

A further aspect of the present invention is a treatment process of a hydraulic and/or pozzolanic material comprising the steps of:

preparation of a cationic composition comprising water and at least one water-soluble cationic polymer having a density of cationic charges greater than 0.5 meq/g and an intrinsic viscosity less than 1 dl/g by way of active matter;

mixing the said cationic composition with the said at least one hydraulic and/or pozzolanic material;

the said hydraulic and/or pozzolanic material not being clinker, nor limestone, nor gypsum, nor calcium sulphate, nor anhydrous calcium sulphate, nor hemi hydrated calcium sulphate, nor plaster, nor lime.

Preferably, the process according to the present invention comprises a preparation step of a cationic composition which further comprises at least a superplasticizer.

Preferably, the process according to the present invention comprises an additional step of adding an accelerator. The said accelerator may be any known accelerator, advantageously a calcium salt.

Preferably, the hydraulic and/or pozzolanic material, the water-soluble cationic polymer and the superplasticizer of the process according to the present invention have the same characteristics as those described hereinabove.

A cationic composition comprising the two ionic polymers of opposite charges is particularly advantageous. It is indeed surprisingly stable and does not form precipitates.

It is assumed that this effect is related to the steric hindrance of the comb polymer, which limits the accessibility of the charges carried by the polymer and hence avoids the precipitation of the polymers of opposite charges.

Advantageously, the composition comprises at most 50% by weight, and in particular at most 30% by weight of superplasticizer. Particularly preferred is a composition comprising from 20 to 30% by weight of superplasticizer relative to the total weight (superplasticizer+cationic polymer).

The cationic composition may be used according to the envisaged application, in the solid form (granule, bead, fine powder) or liquid form. Preferably, it is in the form of an aqueous solution. It may comprise, besides the active matter and the solvent or solvents, in particular at least a typical admixture, for example a grinding agent, an accelerator, an air-entraining agent, a thickening agent, a retarder, a fluidizer, an anti-shrinkage agent or mixtures thereof.

The dosage is particularly suitable for the liquid forms. On another hand, due to the relatively low molecular weight of the selected macromolecules, it is possible to use aqueous solutions at high concentrations of polymer without problems related to high viscosities. It is particularly interesting to use high concentrations of polymer to reduce costs (transport, storage). The concentration of polymer in the solution may vary, but is generally comprised from 20 to 80% by weight.

As a variant, it is possible to envisage preparing a pre-mix of a small quantity of the said hydraulic and/or pozzolanic material with the water-soluble cationic polymer, then adding this pre-mix to the remaining quantity of the said hydraulic and/or pozzolanic material.

The cationic composition according to the present invention is preferably in liquid form. It may be mixed, sprinkled or sprayed on the hydraulic and/or pozzolanic materials according to the present invention to be treated. Preferably the treatment is carried out by simply mixing or simply putting in contact.

The treatment of the hydraulic and/or pozzolanic material according to the present invention may take place at different times. First of all, the cationic composition according to the present invention may be added before, during and/or after the grinding of the said hydraulic and/or pozzolanic materials, preferably after the said grinding. According to a variant, the cationic composition according to the present invention may be mixed with the said hydraulic and/or pozzolanic materials by means of all or part of the mixing water, before the mixing with the cement. Finally, according to another variant, the cationic composition according to the present invention may be added to the said hydraulic and/or pozzolanic materials before, during and/or after the co-grinding with the Portland clinker.

The hydraulic and/or pozzolanic materials thus treated may be used in the typical manner, in particular for the preparation of hydraulic compositions. They are useful for the preparation of hydraulic compositions having constant properties.

The described cationic composition is stable over time and resists to heat and to freezing.

A further aspect of the present invention is the use of a mix according to the present invention for the production of a hydraulic composition.

A further aspect of the present invention is the use of a hydraulic composition as described hereinabove for the production of a hardened object.

Preferably, the mix, the cement, the cationic polymer and the superplasticizer in the uses according to the present invention have the same characteristics as those described hereinabove.

Finally, a further aspect of the present invention is a hardened object obtained from a hydraulic composition as described hereinabove. Preferably, the mix, the water-soluble cationic polymer and the superplasticizer of the hardened object according to the present invention have the same characteristics as those described hereinabove.

The following examples illustrate the invention without restricting its scope.

Measurement of the Spread and Monitoring of the Theology

The spread of a mortar is measured using a mini Abrams cone, the volume of which is 800 mL. The dimensions of the cone are the following:
diameter of the circle of the upper base: 50+/−0.5 mm;
diameter of the circle of the lower base: 100+/−0.5 mm;
height: 150+/−0.5 mm.

The cone is placed on a dried glass plate and filled with fresh mortar. It is then leveled. The lifting of the cone provokes a slump of the mortar paste on the glass plate. The diameter of the obtained disc is measured in millimetres. This is the spread of the mortar.

The consistency of a mortar is considered good when the measurement of the spread is close to 320 mm.

These operations, repeated at several time periods (5, 15, 30 and 60 minutes), make it possible to monitor the evolution of the mortar's rheology for one hour.

Measurement of the Mechanical Strengths

One hour after mixing the formulation, three specimens are poured into steel 4×4×16 cm moulds. The specimens are poured in one single layer and shocked 60 times on the shock table. The moulds are then covered with a glass pane (with a joint) and placed in a cabinet at 100% hygrometry. The specimens are demoulded 24 hours after mixing. One of the specimens is immediately broken after demoulding. The two other specimens are immersed in tanks of water at 20° C. until 28 days after mixing and are then broken.

EXAMPLES

Cationic Polymer

The cationic polymers are characterised by means of their cationicity and molecular weight.

1) Measurement of the Cationicity

Cationicity or density of cationic charges (in meq/g) represents the quantity of charges (in mmol) carried by 1 g of polymer. This property is measured by colloidal titration by an anionic polymer in the presence of a coloured indicator which is sensitive to the ionicity of the polymer in excess.

In the examples below, the cationicity was determined in the following manner. In an appropriate recipient were introduced 60 ml of a buffer solution of sodium phosphate at 0.001 M—pH 6 and 1 ml of a o-toluidine blue solution at $4.1 \times 10^{-4}$ M then 0.5 ml of the solution of cationic polymer to be dosed.

This solution was titrated with a solution of potassium polyvinylsulfate until the indicator changed.

The cationicity was obtained by the following relation:

$$\text{(meq/g)} = (V_{epvsk} * N_{pvsk}) / (V_{pc} * C_{pc})$$

in which:

$V_{pc}$ is the volume of solution of the cationic polymer;
$C_{pc}$ is the concentration of the cationic polymer in solution;
$V_{epvsk}$ is the volume of solution of potassium polyvinylesulfate; and
$N_{pvsk}$ is the normality of the solution of potassium polyvinylesulfate.

2) Measurement of the Intrinsic Viscosity

The measurements of the intrinsic viscosity of the cationic polymers are carried out in a solution of NaCl 3 M, with a capillary viscosimetre of the Ubbelhode type, at 25° C.

The flowing time in the capillary tube is measured between two reference marks for the solvent and the solutions of the polymer at different concentrations. The reduced viscosity is calculated by dividing the specific viscosity by the concentration of the solution of polymer. The specific viscosity is obtained for each concentration, by dividing the difference between the flowing times of the solution of polymer and the solvent, by the flowing time of the solvent. By tracing a straight line of the reduced viscosity as function of the concentration of the solution of polymer, a straight line is obtained. The intersection with the Y axis of this straight line corresponds to the intrinsic viscosity for a concentration equal to zero.

This value is co-related to the average molecular weight of a polymer.

Formulae of Mortars

TABLE 1

|  | Mass |
| --- | --- |
| Cement | 595-X g |
| Hydraulic and/or pozzolanic material according to the present invention | X g |

TABLE 1-continued

|  | Mass |
|---|---|
| Pre-wetting water | 114 g |
| Mixing water | 263 g |
| Standardized sand | 1350 g |
| PE2LS sand | 330 g |
| Admixture | Y g |

The cement was a CEM I 52.5N CE CP2 NF type of cement (from Le Havre—Lafarge plant).

The standardized sand was a siliceous sand according to the EN 196.1 Standard (supplier: Nouvelle du Littoral).

The PE2LS sand was a siliceous sand with a diameter less than or equal to 0.315 mm (supplier: Fulchiron).

The admixture was Glenium 27 (dry extract: 20.3% by mass; supplier: BASF).

The cationic polymer used for all the following examples was a polyamine epichlorhydrine—dimethylamine, having a cationicity of 7.3 meq/g and an intrinsic viscosity of 0.04 dl/g (FL2250; dry extract: 55% by mass; supplier: SNF).

The treatment of the hydraulic and/or pozzolanic materials according to the present invention by the cationic composition was carried out by mixing the cationic solution with the said hydraulic and/or pozzolanic materials. After mixing, the cationic solution and the hydraulic and/or pozzolanic materials were energetically stirred for 20 to 30 seconds, then left to rest for four minutes, and finally used in the mortar.

The dosage of cationic polymer is given in ppm (or mg/kg) of dry polymer per kilogram of hydraulic and/or pozzolanic material according to the present invention.

Protocol for Preparation of the Mortar:

The sand, then the pre-wetting water are introduced in a Perrier mixing bowl and stirred at low speed (140 rpm). It is left to rest for four minutes before introducing the binders (cement, hydraulic and/or pozzolanic materials as defined according to the present invention). The mixing is resumed for one minute at low speed then the mixing Examples with a Calcined Clay (from France—Malet)

composition according to the present invention (Example 6), while it is 0.3% for the composition without treatment, for an equivalent rheology (spread after five minutes respectively at 330 mm for Example 4 and 335 mm for Example 6).

On another hand, the hydraulic compositions according to the present invention make it possible to obtain better strengths for a same amount of admixture. Comparing Examples 4 and 7, it can be seen that the dosage of admixture is 0.3% in both cases, but the W/Binder ratio is 0.63 in Example 4, while it is 0.53 for the hydraulic composition according to the present invention (Example 7), and the 1-day strengths are respectively 9.4 MPa for Example 4 and 11.2 MPa for Example 7.

Tables 2, and 3, illustrate the fact that the substitution of part of the cement by a hydraulic and/or pozzolanic material, the said material not being clinker, nor limestone, nor gypsum, nor calcium sulphate, nor anhydrous calcium sulphate, nor hemi hydrated calcium sulphate, nor plaster, nor lime, generally induces a degradation of the rheology but also of the mechanical performances (passage from line 1 to line 2).

The loss in terms of rheology is typically recovered by means of an addition of water (passage from line 2 to line 3) which results in an important drop of the mechanical performances. It is also possible to recover the reference rheology by introducing an admixture (passage from line 2 to line 4) but the amount of admixture is important and appreciably impacts the global cost of the formula. The non-addition of water relative to the case of line 3 therefore makes it possible to obtain the mechanical performances mentioned in line 2.

Lines 5, 6 and 7 illustrate the interest of the invention since it makes it possible, for a constant rheology, to either reduce the addition of water (passage from line 3 to line 5) and thus obtain higher strengths, or reduce by 30% the amount of admixture (passage from line 4 to line 6) or reduce the amount of water without reducing the admixture (passage from line 4 to line 7), which makes it possible to obtain higher strengths in the example without treatment (line 2), thus making it possible to obtain a binder having a rheology which is compatible with the expectations of the users.

Examples with Fly Ash

The fly ash used for the present example was the Rosa fly ash (supplier: ScotAsh), the chemical composition and specific surface of which are given in the following Table 4. This fly ash has a loss on ignition of 12.1% by mass, measured according to the EN 196-2 Standard.

The tested fly ash does not comprise clay per se, but may possibly comprise a particular form of calcined clay (mullite).

TABLE 3

| Clay | Substitution rate (1) % | Dosage Clay treatment dry ppm/ clay | Dosage of the admixture dry %/ binder (2) | W/Binder | Spread at 5 minutes mm | 1-day Compressive strength MPa | 28-day Compressive strength MPa |
|---|---|---|---|---|---|---|---|
| 8 Calcined clay | 0 | — | 0.1 | 0.63 | 340 | 18.1 | 42.6 |
| 9 Calcined clay | 30 | — | 0.1 | 0.63 | 155 | 6.9 |  |
| 10 Calcined clay | 30 | — | 0.1 | 0.87 | 345 | 3.2 | 24.1 |
| 11 Calcined clay | 30 | — | 0.4 | 0.63 | 350 | 6.4 | 37.4 |
| 12 Calcined clay | 30 | 2000 | 0.1 | 0.75 | 330 | 4.7 | 32.7 |
| 13 Calcined clay | 30 | 2000 | 0.3 | 0.63 | 335 | 7.3 | 37.1 |

According to Tables 2 and 3 hereinabove, one observes that the hydraulic compositions according to the present invention make it possible to reduce the quantity of admixture used to obtain a hydraulic composition having the same performances (rheology and mechanical strengths). Comparing Examples 4 and 6, the dosage of admixture is 0.2% for the

TABLE 4

| (mass percentages or ppm) | | | | | | | | | |
|---|---|---|---|---|---|---|---|---|---|
| $SiO_2$ | $Al_2O_3$ | $Fe_2O_3$ | CaO | MgO | $K_2O$ | $Na_2O$ | $SO_3$ | $TiO_2$ | $Mn_2O_3$ |
| 41.16% | 25.39% | 3.46% | 10.46% | 2.07% | 0.74% | 0.26% | 0.63% | 1.21% | 0.06% |
| $P_2O_5$ | $Cr_2O_3$ | $ZrO_2$ | SrO | ZnO | $As_2O_3$ | BaO | CuO | NiO | PbO |
| 1.11% | 0.02% | 0.04% | 0.24% | 0% | 32 ppm | 2216 ppm | 181 ppm | 132 ppm | 42 ppm |
| $V_2O_5$ | | CaOl | | $K_2$Osol | | $Na_2$Osol | Density | Blaine Specific Surface | |
| 373 ppm | | 0.7% | | <0.05% | | <0.05% | 2.29 | 3510 cm$^2$/g | |

In this example, the substitution rate of the cement was 25% by volume, which corresponds to X=109.2 g of fly ash (see Table 1).

As regards the admixture, Y=2.35 g, which corresponds to approximately 800 ppm by mass of admixture relative to the cement.

The quantity of cationic polymer was 1.08 g (which corresponds to 1000 ppm by mass relative to the cement) and 2.16 g (which corresponds to 2000 ppm by mass relative to the cement).

Table 5 below records the results obtained with the fly ash described hereinabove.

TABLE 5

| | Spread (mm) | | | |
|---|---|---|---|---|
| Binder | 5 min | 15 min | 30 min | 60 min |
| 100% cement - without treatment | 330 | 325 | 300 | 280 |
| 100% cement Treated with 1.08 g of cationic polymer | 360 | 355 | 345 | 330 |
| 100% cement Treated with 2.16 g of cationic polymer | 360 | 350 | 340 | 325 |
| 75% cement - 25% fly ash without treatment | 295 | 260 | 215 | 175 |
| 75% cement - 25% fly ash Treated with 1.08 g of cationic polymer | 315 | 295 | 260 | 210 |
| 75% cement - 25% fly ash Treated with 2.16 g of cationic polymer | 335 | 320 | 295 | 260 |
| 75% cement - 25% fly ash Treated with 3.24 g of cationic polymer | 360 | 330 | 320 | 275 |
| 75% cement - 25% fly ash Treated with 4.32 g of cationic polymer | 355 | 330 | 315 | 265 |

According to Table 5 hereinabove, one observes that the substitution of part of the cement with fly ash induces a drop of the spread, which passes for example from 330 mm at five minutes for a formulation with 100% of cement without treatment, to 295 mm at five minutes, for a formulation with 25% of fly ash without treatment.

The treatment with the cationic polymer according to the present invention induces an increase of the spread, which passes for example from 295 mm at five minutes, for the formulation with 75% of cement and 25% of fly ash without treatment, to 315 mm at five minutes, for a formulation with 75% of cement and 25% of fly ash treated with 1.08 g of cationic polymer.

On another hand, contrary to the formulation with 100% of treated cement, for which the spread at five minutes is 360 mm whatever the quantity of cationic polymer used, the effect of the cationic polymer according to the present invention for the formulations with 75% of cement and 25% of fly ash depends on the quantity of cationic polymer used for the treatment. The spread at five minutes for the formulation with 75% of cement and 25% of fly ash is 315 mm at five minutes with 1.08 g of cationic polymer and 335 mm with 2.16 g of cationic polymer. In the formulations comprising fly ash one observes a ceiling rate for the same spread (355-360 mm at 5 minutes) for a higher dosage of cationic polymer according to the present invention (beginning at 3.24 g of cationic polymer).

Furthermore, for the tested fly ash not having clay, the effect observed of the cationic polymer according to the present invention does not have an inerting effect on the clays, but indeed an additional effect on the fly ash itself or on other impurities which it can comprise.

Finally, it should be noted that the spread of the formulation with 25% of fly ash treated with 2.16 g of cationic polymer comes close to the spread of the formulation with 100% of non-treated cement.

Example with Silica Fume

The silica fume used for this example is commercialised by the "Société Européenne des Produits Réfractaires" under the brand name MST.

The formula of the tested mortar is the one described in Table 1 hereinabove, in which the cement, the sands, the admixture and the cationic polymer are the same as those described.

The treatment protocol with the cationic polymer according to the present invention and the preparation protocol of the test mortar are the same as those previously described.

Table 6 below records the results obtained by substituting 10% by mass of cement with the silica fume described hereinabove.

TABLE 6

| | Water Mass of water/mass of binder | Admixture % dry mass of admixture/ mass of binder | Spread (mm) | | | |
|---|---|---|---|---|---|---|
| Binder | | | 5 min | 15 min | 30 min | 60 min |
| 100% cement without treatment | 0.633 | 0.06 | 315 | 275 | 235 | 200 |
| 90% cement 10% silica fume without treatment | 0.633 | 0.06 | 280 | 270 | 265 | 235 |

TABLE 6-continued

| Binder | Water Mass of water/mass of binder | Admixture % dry mass of admixture/ mass of binder | Spread (mm) 5 min | 15 min | 30 min | 60 min |
|---|---|---|---|---|---|---|
| 90% cement 10% silica fume, treated with 875 ppm of cationic polymer | 0.633 | 0.06 | 295 | 285 | 280 | 265 |

According to Table 6 hereinabove, when part of the cement is substituted with silica fume, the spread of the mortar at 5 minutes decreases and passes from 315 mm to 280 mm.

When the binder comprising the cement and the silica fume is treated with the cationic polymer according to the present invention, the spread of the mortar increases at all the time periods. For example, the spread of the mortar at 15 minutes passes from 270 mm to 285 mm due to the treatment with the cationic polymer according to the present invention. Likewise, the spread of the mortar at 60 minutes passes from 235 mm to 265 mm.

The invention claimed is:

1. A mix comprising at least one pozzolanic material and at least one water-soluble cationic polymer, said cationic polymer having a density of cationic charges greater than 0.5 meq/g and an intrinsic viscosity less than 1 dl/g.

2. The mix according to claim 1, comprising at least one superplasticizer.

3. The mix according to claim 1, comprising an accelerator.

4. The mix according to claim 1, wherein the pozzolanic material is selected from natural pozzolans, calcined pozzolans, calcined clays, fly ash, calcined shale, slags, silica fume or mixtures thereof.

5. The mix according to claim 4, wherein the pozzolans are selected from pumice, tuff, scoria or mixtures thereof.

6. The mix according to claim 4, wherein the calcined clays are selected from thermally activated kaolinite, smectites, illite, muscovite, chlorites, or mixtures thereof.

7. A hydraulic composition comprising at least one mix according to claim 1 and at least one hydraulic binder.

8. The hydraulic composition according to claim 7, wherein said hydraulic binder is a Portland cement.

9. The hydraulic composition according to claim 7, comprising aggregates.

10. The hydraulic composition according to claim 7, comprising an accelerator.

11. A process for the treatment of a pozzolanic material comprising:
preparing a cationic composition comprising water and at least one water-soluble cationic polymer having a density of cationic charges greater than 0.5 meq/g and an intrinsic viscosity less than 1 dl/g by way of active matter;
mixing said cationic composition with said at least one pozzolanic material.

12. The process according to claim 11, wherein said cationic composition further comprises at least one superplasticizer.

13. A method comprising producing a hydraulic composition using a mix according to claim 1.

14. A method comprising producing a hardened object using a hydraulic composition according to claim 7.

15. A hardened object obtained from a hydraulic composition according to claim 7.

* * * * *